Patented Apr. 4, 1939

2,153,331

UNITED STATES PATENT OFFICE 2,153,331

PROCESS FOR THE PREPARATION OF GUNPOWDER BY MEANS OF AN ACETONE AND ALCOHOL SOLVENT MIXTURE

Alfons Kunz, Fuzfo, Hungary, assignor to Nitrokémia Ipartelepek Részvénytársaság, Budapest, Hungary, a Hungarian company No Drawing. Application November 10, 1936, Serial No. 110,191. In Hungary August 28, 1936

2 Claims. (Cl. 52—20)

The invention relates to a process for the preparation of nitrocellulose gunpowder in which process an acetone and alcohol solvent mixture is used.

Nitrocellulose is gelatinised with organic solvents in working up into gunpowder. Processes are known in which very volatile solvents are used for gelatinising. In the course of time two processes have come to the fore in industry, namely, the acetone and alcohol and the ether and alcohol processes.

In the acetone and alcohol process the nitrocellulose alcoholised in known manner is added to the acetone in such quantity that there is obtained a mouldable gunpowder mass which can be worked up in presses.

Acetone is capable of dissolving nitrocellulose of every description. In the same way in the above mentioned process the acetone and alcohol mixture containing acetone in considerable quantity is capable of dissolving nitrocellulose of every description. On this account, the solubility of the particular nitrocellulose employed is of little consequence in the acetone and alcohol process.

On the other hand, in the ether and alcohol process for the preparation of gunpowder two kinds of nitrocellulose are used of which one is entirely soluble in the ether and alcohol mixture, that is to say, will be gelatinised, whilst the other dissolves only to a small extent in the ether and alcohol mixture, that is to say, is gelatinised only to a small extent. In the ether and alcohol process in contradistinction to the acetone and alcohol process, a nitrocellulose with a high nitrogen content which dissolves only to a small extent in the ether and alcohol mixture is embedded as filler in a well gelatinised nitrocellulose with low nitrogen content.

The structures of the gunpowders obtained in the above two processes are different so far as the manner and degree of gelatinisation is concerned, which are quite different. The gunpowder obtained with the acetone and alcohol process is gelatinised entirely throughout, whilst the gunpowder obtained with the ether and alcohol process consists of a gelatinised material as matrix in which is embedded an ungelatinised filler.

It has been found that the gunpowder prepared with the ether and alcohol process is to a considerable degree superior with regard to its ballistic properties to that obtained by the acetone and alcohol process. However, the ether and alcohol process is appreciably more expensive and more dangerous than the acetone and alcohol process. The low boiling point of the ether causes an appreciable loss by evaporation. The ether-alcohol vapours form an explosive mixture with air over a wide range of proportions and in considerably greater amount than the acetone-alcohol vapours. The ether has a tendency for the formation of peroxide which is dangerous and causes undesirable oxidation effects. Ether is also dearer than acetone and larger amounts are required for the manufacture.

The invention combines the advantages of the two processes above described without the disadvantages of the ether and alcohol process.

The good quality of the gunpowder obtained by the ether and alcohol process is due to its structure in which the non-gelatinised material is embedded as filler in the gelatinised material.

I have now found that the same structure can be obtained with the acetone and alcohol process by the proper selection of the proportions of acetone and alcohol in the solvent mixture and the respective qualities of the nitrocelluloses.

According to the invention an acetone and alcohol mixture is employed for the preparation of nitrocellulose gunpowder, the acetone content of which is less than 40% and, as in the ether and alcohol process, a nitrocellulose is employed, one part of which is completely soluble or is gelatinised in the above mentioned solvent and the other part is only partially soluble or partially gelatinised.

A particularly good result is obtained if the amount of acetone in the solvent mixture is 25–35%.

Water-free ethyl alcohol may be used as solvent and also the usual 96% ethyl alcohol.

Furthermore, a nitrocellulose with a nitrogen content of less than 12.5% may be used as the matrix material and a nitrocellulose with a nitrogen content above 13% as filler.

The relationship between the amount of the matrix material and the filler may be similar to that usual in the ether and alcohol process, i. e. approximately $\frac{1}{5}$ to $\frac{1}{3}$ parts by weight matrix material and $\frac{4}{5}$ to $\frac{2}{3}$ of filler.

Example 27 parts by weight of nitrocellulose having a nitrogen content of 12.2% is taken as matrix material and 73 parts by weight of finely cut nitrocellulose with a nitrogen content of 13.5% as filler. The materials are thoroughly mixed and after the alcoholising of the mixture, a solvent mixture is added which consists of 27% acetone and 73% alcohol of 96% strength. The amount of the solvent mixture reckoned on the dry nitrocellulose is 0.85 part by weight. The well wetted mass is then worked up in known manner to gunpowder.

10 grammes of a dry nitrocellulose with 13.5% nitrogen content dissolve in 500 c. c. of the above mentioned solvent similarly as in the ether and alcohol mixture only to the small extent of 5–6%. The matrix material given in the example with 12.2% nitrogen content dissolves in the acetone and alcohol mixture mentioned just as easily as in the usual ether and alcohol mixture.

The gunpowder prepared has the same desirable properties as that obtained by the ether and alcohol process with the same nitrogen content.

The acetone may be partially replaced by methyl alcohol in the process according to the invention. In the example ½ of the acetone may be replaced by methyl alcohol.

Nitro-glycerine may be added to the gunpowder mass in the process according to the invention in a similar manner as in the known acetone and alcohol and ether and alcohol processes, if it is required to prepare a nitro-glycerine-containing gunpowder by a process in which a solvent is used.

I claim:

1. A process for preparing nitrocellulose gunpowder wherein a volatile alcohol-acetone mixture is employed for gelatinisation and wherein the proportion of acetone used in said mixture is 25–35% and the nitrocellulose employed with this mixture consists of ⅕ to ⅓ parts by weight of a product with a nitrogen content of less than 12.5% and ⅘ to ⅔ parts by weight of a product with more than 13% nitrogen content.

2. A process for preparing nitrocellulose gunpowder, wherein a volatile alcohol-acetone mixture is employed for gelatinisation and wherein the proportion of acetone used in said mixture is 25–35% and the nitrocellulose employed with this mixture consists of 27% by weight of a product with a nitrogen content of 12.2% and 73% of a product with 13.5% nitrogen content.

ALFONS KUNZ.